United States Patent [11] 3,553,483

| [72] | Inventor | John R. Jarvis<br>Dallas, Tex. |
|---|---|---|
| [21] | Appl. No. | 782,178 |
| [22] | Filed | Dec. 9, 1968 |
| [45] | Patented | Jan. 5, 1971 |
| [73] | Assignee | Cook Machinery Co., Inc.<br>Dallas, Tex. |

[54] PROGRAMING MECHANISM
13 Claims, 5 Drawing Figs.

[52] U.S. Cl. ..................................... 307/141,
317/148.5, 307/294
[51] Int. Cl. ..................................... H03k 17/28
[50] Field of Search ........................................ 307/41,
141, 141.4, 141.8, 293, 294; 317/142, 148.5TD

[56] References Cited
UNITED STATES PATENTS

| 3,119,021 | 1/1964 | Podell et al. | 317/148.5TD |
| 3,171,045 | 2/1965 | Jacobs | 307/141 |
| 3,246,182 | 4/1966 | Hanchett | 307/141 |
| 3,309,543 | 3/1967 | Alston et al. | 307/141.4 |
| 3,320,431 | 5/1967 | De Bough et al. | 307/141.4X |
| 3,461,351 | 8/1969 | Heaslip et al. | 317/148.5X |

Primary Examiner—Robert K. Schaefer
Assistant Examiner—T. B. Joike
Attorney—Hyer, Eickenroht, Thompson & Turner ABSTRACT: A programming mechanism is disclosed for controlling the application of power to apparatus performing successive steps in a process. The mechanism includes an electronic timer for controlling the time period of each step. The timer includes an R-C timing circuit, the R-C constant of which may be adjusted to any suitable value for each different step of the process by connecting into the circuit a different R-C circuit element, such as a variable resistor for each step in the process that the circuit controls. For this purpose, a multisection, multiposition stepping switch is connected to the R-C timing circuit and a different variable resistor is connected to one or more of the terminals of the stepping switch so that as the switch is stepped to the next position a different R-C timing constant may be provided to control the time period of the electronic timer.

John R. Jarvis
INVENTOR

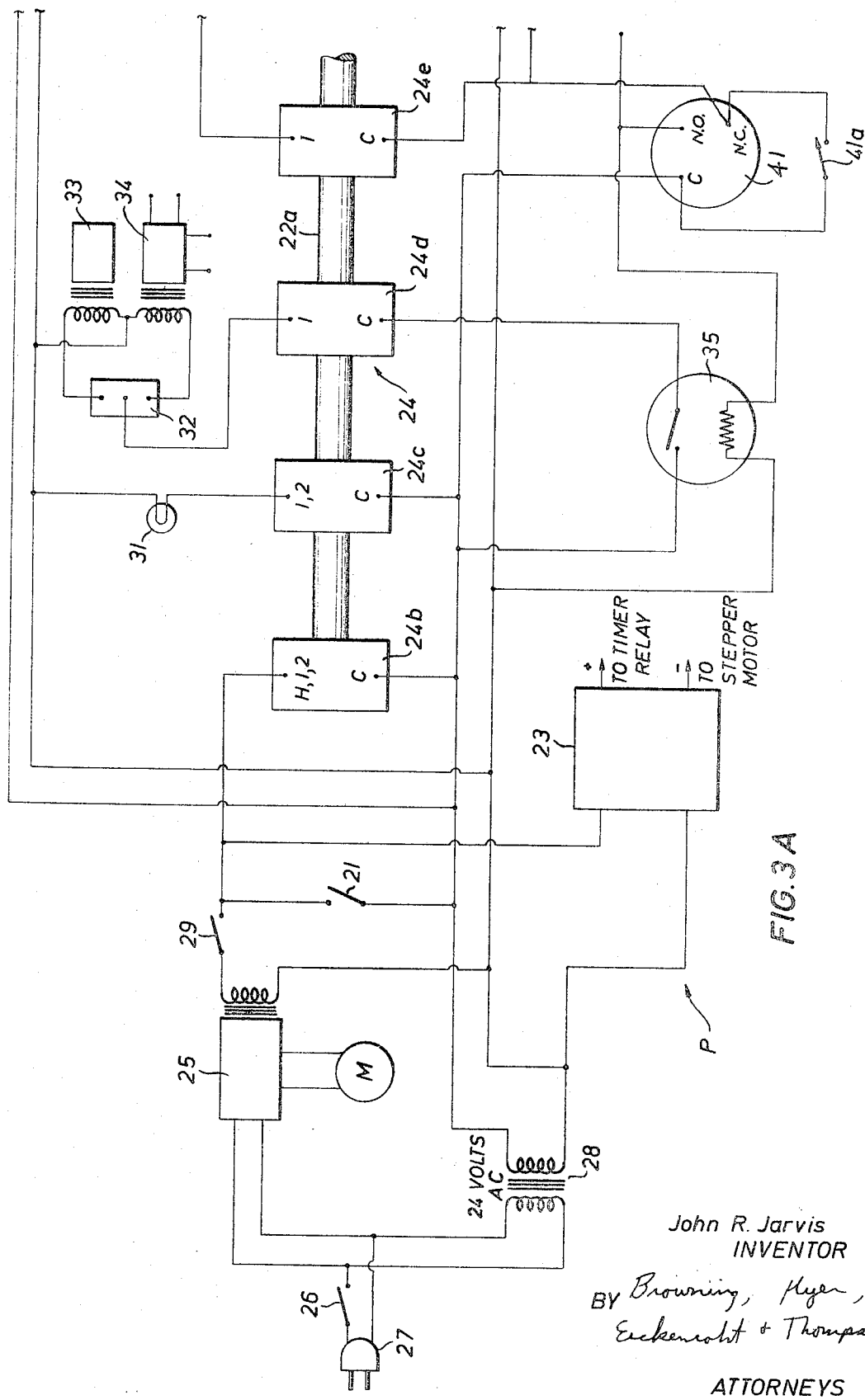

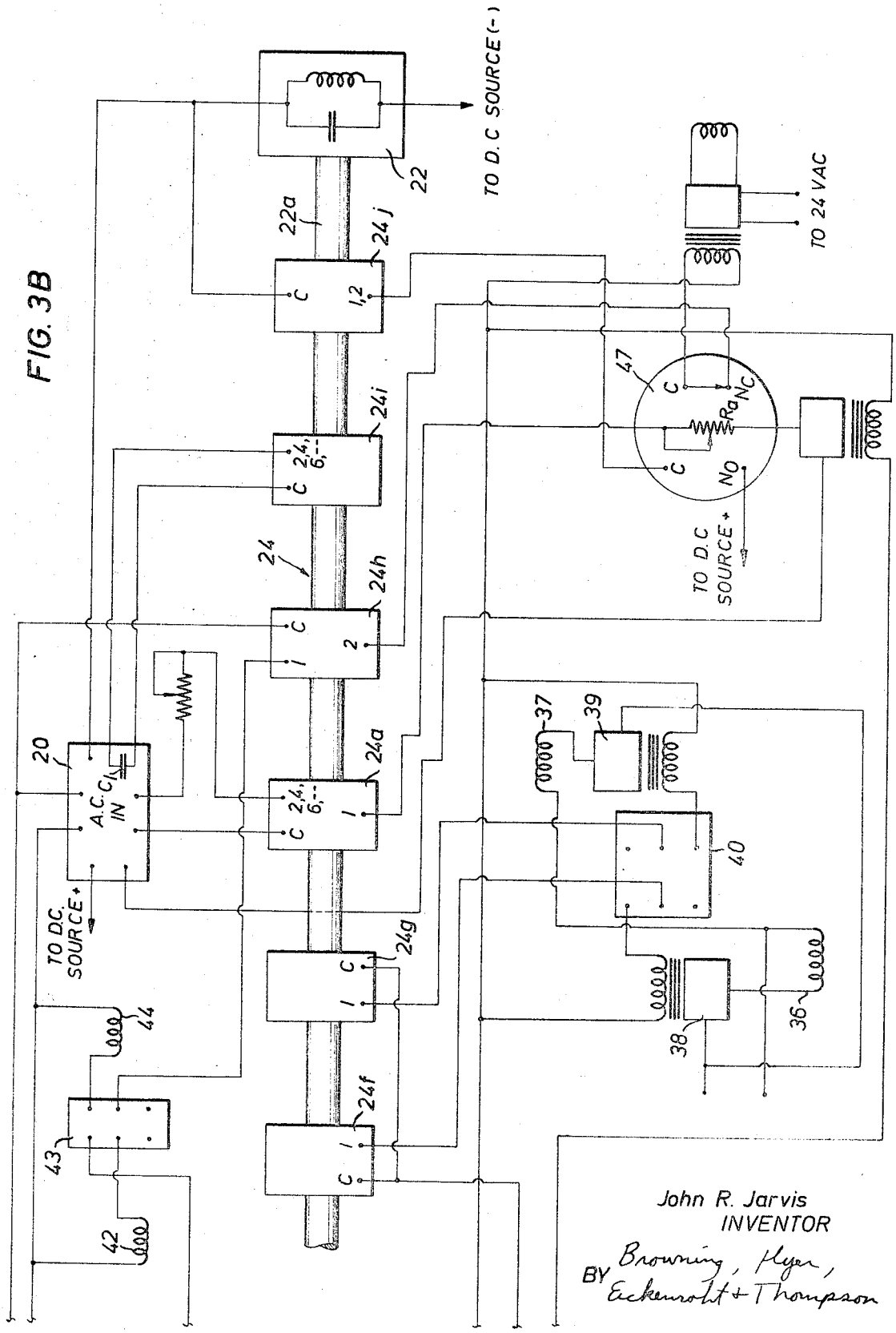

PROGRAMMING MECHANISM

This invention relates to programming mechanisms, generally, and in particular, to a programming mechanism that controls the order in which an apparatus performs the steps of a process and the length of time that each step is performed.

There are many applications for programming mechanisms that will cause a machine or apparatus to perform the steps of a process automatically. Where the sequence and time for each step to be performed by the machine is fixed, mechanical clock or cam type timers have been used. Where greater flexibility is desired, however, such as changes in sequence and time of the steps, it has generally been necessary to use costly tape or computer devices to control the machines.

One important application for programming devices, where flexibility of operation is particularly important, is in commercial washing machines. In commercial washing establishments, the wash cycles include the steps of water fill, wash, drain, rinse, and drain again. Several of these steps may be repeated before the wash cycle stops. Different types of fabrics may require different wash cycles as well as different wash times. Different water temperatures are also desired for different fabrics. The successful washing of all types of items thus requires the ability to program different wash cycles and to vary the time that each step in the cycle is performed. Such an ability permits the shortest time necessary for a proper wash cycle to be set by the operator. Also, since time is an important factor in a large commercial washing establishment and time for draining the water from a washing machine after each wash and rinse cycle may vary with drainage conditions, it is desirable that some sort of variable time control be provided for each drain period.

It is thus an object of this invention to provide a programming mechanism for controlling external apparatus performing one or more functions or one or more steps of a process without the use of cams, cam actuated switches, or computers.

It is another object of this invention to provide such a mechanism including means for setting independently the time period of any step in the process.

It is another object of this invention to provide such a mechanism that is particularly adaptable to controlling the operating sequence of a washing machine.

Another object of this invention is to provide such a mechanism providing independent time setting for each wash period, drain period, and rinse period in the washing cycle.

In the washing machine process, as in many commercial processes, some of steps to be performed must be of fairly long duration, whereas some other steps are of a relatively short duration. For example, in the washing process the wash and rinse cycles may be in the order of 30 minutes or more, whereas no more than several minutes need be allowed for the drain cycle. Since electronic timers presently used are not adapted for sequential switching between the time periods of such long and such short duration, the drain time in a washing cycle has generally been a fixed period, the duration of which has been determined by a cam or other mechanical mechanism.

It is thus another object of this invention to provide an electronic timer for use in a programming mechanism that has one timing circuit providing a relatively long time period that can be used, for example, to control the wash and rinse cycles of a washing machine and a second timing circuit providing a relatively short time period that can be used, for example, to control the drain cycle of a washing machine.

It is another object of this invention to provide such a timer for use in a programming mechanism to control the washing process of a washing machine so that any desired time period can be selected for any step in the washing process including the drain cycle.

Another object of this invention is to provide such a timer which is extremely reliable and relatively simple in construction.

These and other objects, advantages, and features of the invention, which are readily apparent from the attached drawings, the following description, and the appended claims are accomplished with a programming mechanism that includes an electronic timer having a variable time constant timing circuit that is connected through a stepping switch to a selected one of a plurality of adjustable circuit elements, such as variable resistors. Each adjustable element can be independently set to provide a different time period for each step in a process.

In the drawings:

FIGS. 3A and 3B are partially a schematic and partially a block diagram of the programming mechanism of FIG. 2 showing the details of the connections made between the programming mechanism and various washing machine apparatus;

Figure 1:
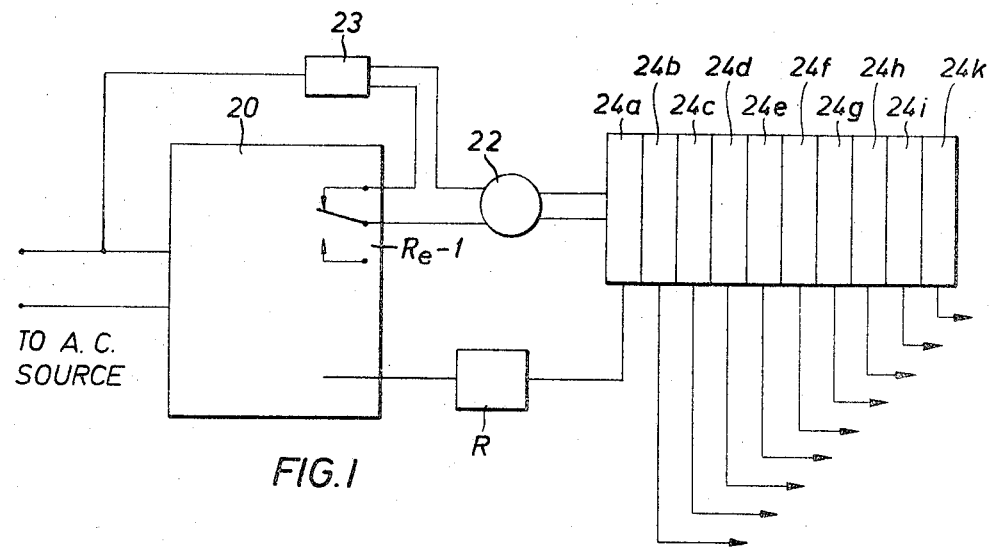
FIG. 1 is partially a schematic and partially a block diagram of the preferred embodiment of the programming mechanism of this invention.

Referring to FIG. 1, the programming mechanism includes electronic timer 20 which begins a predetermined time period in response to being connected to a source of AC voltage (not shown). At the completion of the timing period, switch means Re-1 actuates stepper motor 22 of stepper switch 24 by connecting the stepper motor to source 23 of Dec. current. Stepper motor 22 drives multiposition, multisection, stepping switch 24 through shaft 22a. Stepper switch 24 includes a plurality of rotary switch sections 24a through 24j.

Electronic timer 20 includes a variable time constant timing circuit, such as a R-C timing circuit, for control of the timing period during each step in the process to be controlled. In the embodiment shown, switch wafer 24a connects one of a plurality of adjustable circuit elements R into the timing circuit of the timer at each position of the stepper switch. The adjustable circuit elements allow the time between each actuation of the stepper motor to be adjusted as desired for each position of the switch. Wafers 24b—24j connect the apparatus controlled by the programmer to a source of power (not shown) in a predetermined sequence to cause the apparatus to perform the steps of a given process.

Figure 4:
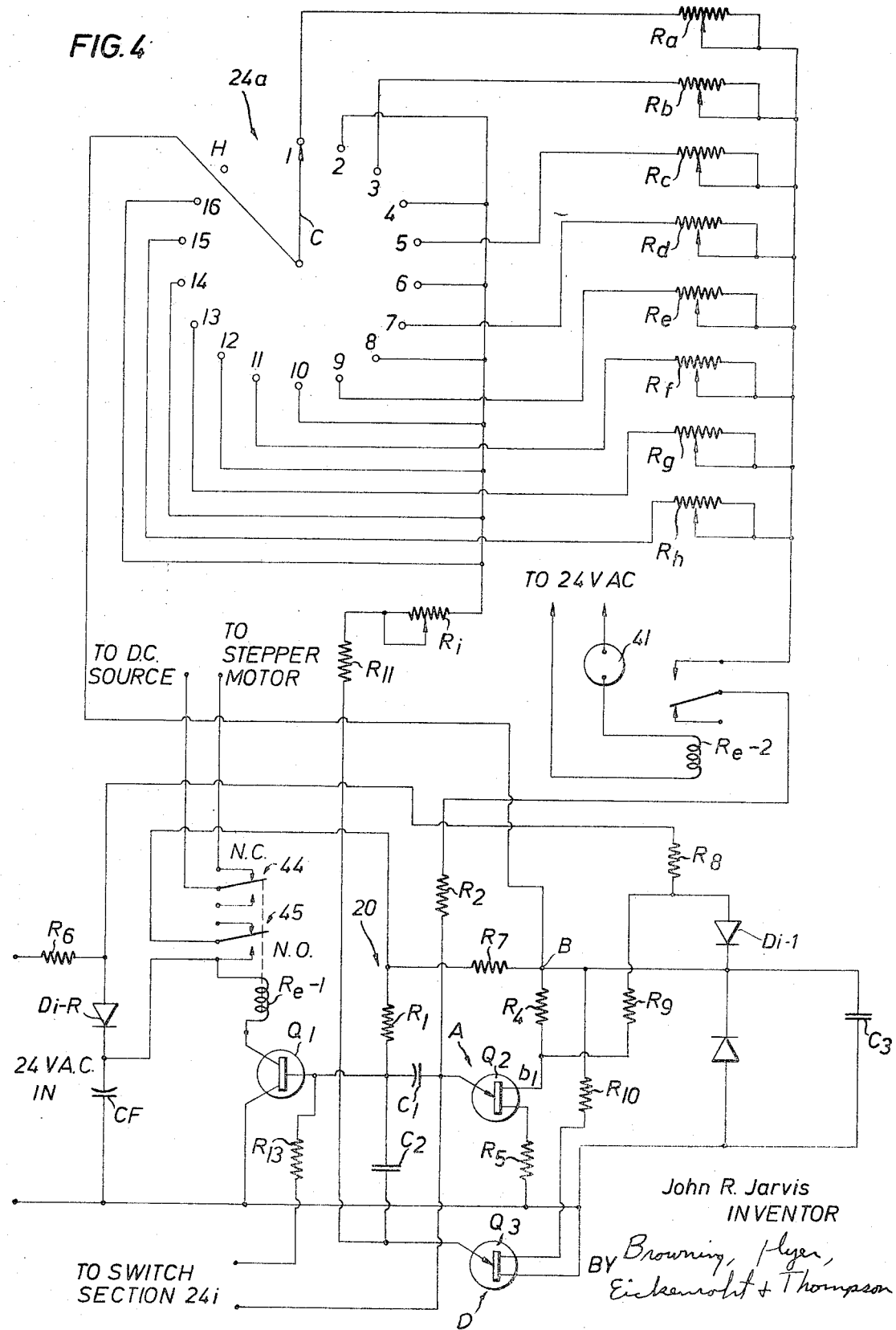
FIG. 4 is an electrical circuit diagram of the programming mechanism of this invention.

Electronic timer 20 is shown in detail in FIG. 4. Timer 20 includes a switching control means including relay Re-1 having normally closed contacts 44 and 45 and transistor $Q_1$ connected through its collector to one side of the coil of Re-1. The other side of the coil of relay Re-1 is connected to a source of DC voltage provided by a conventional DC power supply including rectifier diode D$i$-R and filter capacitor CF connected together and connected to receive AC voltage from the secondary of transformer 28 (shown in FIG. 3A). Thus, when this voltage is received current conducts through the coil of relay Re-1, which switches pole constants of contacts 44 and 45 of this relay from their normally closed position to their open position. Transistor $Q_1$ also conducts a holding current through the coil of relay Re-1 so that contacts 44 and 45 remain in their open position until this holding current is released.

The normally open contact of relay contacts 45 is connected to the DC voltage at the junction of diode D$i$-R and capacitor CF, and the pole contact of contacts 45 is connected to a timing circuit so that the switching of relay Re-1 connects the timing circuit to a source of direct current. The timing circuit is illustrated as including a relaxation oscillator A comprised of unijunction transistor $Q_2$ and an R-C circuit. The R-C timing circuit includes a timing capacitor $C_1$, connected between the base of transistor $Q_1$ and the gate electrode of unijunction $Q_2$, timing resistor $R_2$ connected to the gate electrode of $Q_2$, and one of a plurality of variable timing resistors $R_a - R_h$ selected by waifer section $24_a$ when wiper arm C is in contact with one of the odd numbered terminal positions, 1, 3, 5, .... Wiper arm C on section 24a is connected to point B in FIG. 4 which is connected through resistor $R_7$ to the normally opened terminal of relay contacts 45 to provide a source of charging voltage. As wiper arm C is switched to any of the odd numbered terminals in switch section 24a the voltage from point B is conducted to one of the resistors $R_a$—$R_h$. The wiper arms of each of the variable resistors $R_a$—$R_h$ are connected together and are connected through the contacts of relay Re-2, which functions as explained below, to resistor $R_2$, and through $R_2$ to the gate electrode of unijunction $Q_2$ to provide a charging voltage for capacitor $C_2$. When the charge on capacitor $C_1$ reaches the peak point current of unijunction transistor $Q_2$, this unijunction is caused to fire and an impulse signal is conducted through condenser $C_1$ to transistor $Q_1$ to bias the transistor off. This stops the holding current through transistor $Q_1$ and opens relay Re-1 to stop the timing cycle.

Contacts 44 of Re-1 are normally closed and are connected between a source of DC voltage from DC power supply 23 (FIG. 3A) and stepper motor 22 (FIG. 3B). Thus, when contacts 44 are in their normal position, a DC voltage is conducted to stepper motor 22, moving stepping switch 24 to the next adjacent position. Transistor $Q_1$ is biased off only momentarily in response to the impulse signal from capacitor $C_1$ so that relay contacts 44 are closed only long enough to advance motor 22 one step. However, when the notch wafer section 24b is in the home position (the wiper arm C is connected to terminal H), the conduction of AC voltage to DC supply 23 is stopped so that the closing of relay contacts 44 does not connect motor 22 to DC current to advance it, and the cycling of the programmer is stopped. Also, in the home contact position the wiper arms of the rest of the wafer sections provide open circuits. As shown in FIG. 3A, a cycle start switch 21 is connected across the home contact and wiper arms of wafer section 24b and the closing of this switch will connect the DC supply 23 to the secondary of transformer 28, thus causing stepper motor 22 to advance switch sections 24a—24j to the first terminal position, and start the cycle.

The timing circuit includes a second relaxation oscillator D connected in timer 20 by the even number terminals of switch section 24a. Oscillator D includes an R-C circuit including variable resistor $R_i$, resistor $R_{11}$, a unijunction transistor $Q_3$, and a timing capacitor $C_2$ connected between the base of transistor $Q_1$ and the gate electrode of unijunction $Q_3$. Resistors $R_i$ and $R_{11}$ are connected to point B through the even numbered terminals of switch section 24a to supply capacitor $C_2$ with a source of charging voltage. When the charging voltage on capacitor $C_2$ reaches the peak point current of unijunction $Q_3$, the unijunction fires and a voltage impulse signal is generated and conducted to the base of transistor $Q_1$ to momentarily bias transistor $Q_1$ off and stop the timing period, thus advancing the stepper motor and stepping switch to the next position. If this next position is a terminal other than the home terminal H, a new timing cycle is started with the time period controlled by the variable resistor connected to the terminal of the switch section 24 a that is connected to wiper arm C. However, if the terminal switched to is the home terminal, it will be necessary to actuate cycle start switch 21 to start the cycle over.

Relaxation oscillator A preferably has a relatively long timing period as compared to that of relaxation oscillator D. A relatively long timing period for oscillator A is provided by conducting low value negative pulses to one of the bases of unijunction $Q_2$ to reduce the peak point current requirements of the unijunction. As illustrated this is accomplished by clamping an AC voltage to a low negative value and conducting this low negative value pulse to base $b_1$ of unijunction $Q_2$. The voltage for this is obtained from the 24 volt AC supply in the illustrated embodiment. A resistor $R_8$ is connected between the AC side of diode D$i$-R and diode D$i$-1 and drops the AC voltage to a suitable value. Diode D$i$-1 is connected between $R_8$ and point B and clamps the resulting voltage at its anode to the required low negative value. This voltage is conducted from D$i$-1 through resistor $R_9$ to base $b_1$ of unijunction $Q_2$ to provide a series of negative pulses. These low value negative pulses are in the order of .6 volts and cause a substantial reduction in the peak point current of unijunction $Q_2$, so that by proper selection of the timing resistors and capacitor $C_1$, timing periods in excess of an hour can be provided. The duration of this timing period is set by adjustment of resistors $R_a$—$R_h$ in timing circuit A. In contrast, the components of relaxation oscillator D are selected to provide timing periods in the range of several minutes.

The programming mechanism described above is particularly adaptable to controlling the process of washing clothes or other items with a commercial washing machine. The clothes washing process of a commercial washing machine is generally divided into a number of wash and rinse cycles. During each such cycle, clean water is introduced into the washing machine tub and agitated by the tub to wash the clothes. Following each wash or rinse cycle, the dirty water is drained from the tub. The programmer of the invention is shown in the drawings controlling the operation of such a commercial washing machine.

Thus, with the arrangement of the programming mechanism described, each of variable resistors $R_a$—$R_h$ is set to adjust the timing period of either a wash or rinse cycle in the commercial washing machine process. The variable resistor $R_i$ is set to the desired drain time period after each of the wash or rinse cycles is completed.

Figure 2:
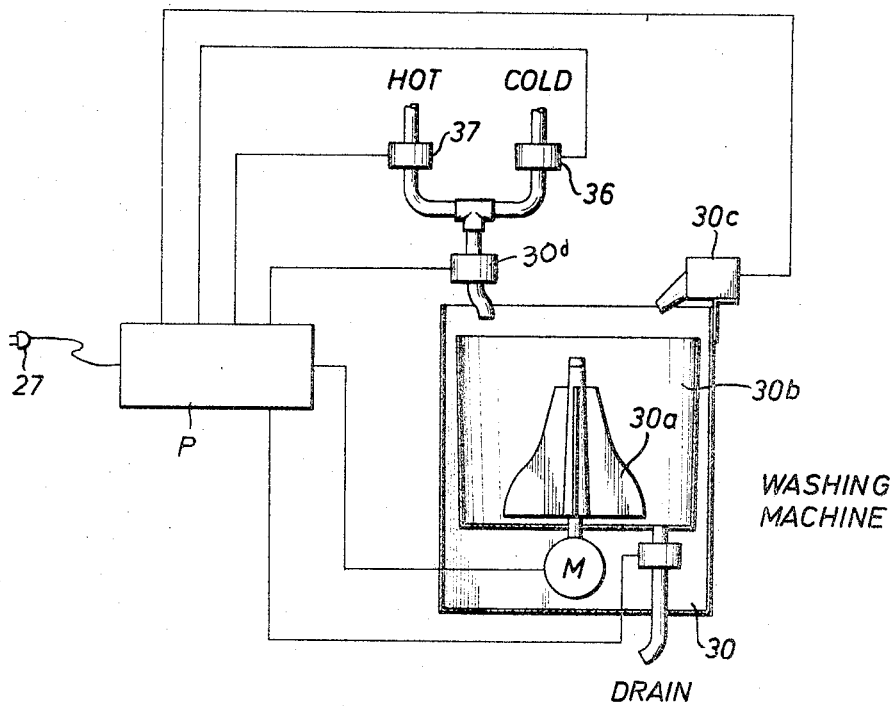
FIG. 2 is a block diagram of such a mechanism connected to control the operation of a washing machine.

In FIG. 2, programmer P controls the application of power to washing machine 30. The washing machine includes motor M connected to agitator 30a and tub 30b in which the items to be washed (not shown) and wash water are placed.

As illustrated in FIG. 2, valves 36 and 37 control the flow of cold and hot water into mixing chamber 30d from where the water flows into tub 30b. Motor M is connected through the contacts (not shown) of relay 25 of programming mechanism P and master on-off switch 26 to a source of alternating current, such as through plug 27. Motor M operates agitator 30a during the wash and rinse cycles of the washing process. Also connected to plug 27 is 24-volt transformer 28, which provides a source of 24-volts AC at its secondary terminals. The coil (not shown) of relay 25 is connected on one side to the secondary transformer 28. The other side is connected to this secondary through motor switch 29 and rotary switch section 24b of stepping switch 24. In the embodiment of this invention illustrated in FIGS. 2, 3A and 3B, since the washing process may include as many as eight wash and rinse cycles and thus eight drain cycles, each of rotary switch sections 24a—24j includes at least 16 stationary terminals and a wiper arm C. The odd terminals (1, 3, etc.,) are connected to the wiper arm during wash or rinse cycles and even numbered terminals are connected to the wiper arm during the drain cycle. The last terminal switched to, immediately following the last drain cycle, functions as a home terminal wherein the process is stopped, but the programming mechanism is armed to repeat the process, or another subsequently selected process, upon actuation of start switch 21. In FIGS. 3A and 3B, for purposes of illustration, apparatus for performing only one wash or rinse cycle and one drain cycle is shown, with the exception of that apparatus which is common to all steps in the wash process. Thus, each of the switch sections of stepper switch 24 are illustrated with only the wiper arm C and one terminal and connected apparatus, except switch section 24b which is illustrated with the wiper arm and the home terminal.

A plurality of lamps are provided to indicate which stage of the process the machine is performing. As shown, lamp 31 is connected across the secondary of transformer 28 through switch section 24c. During the first wash cycle of the process and its corresponding drain period, lamp 31 is connected across the transformer by stationary switch terminals 1 and 2 of section 24c. A corresponding lamp for the second step, for example, the first rinse cycle and drain cycle, would be connected to terminals 3 and 4, etc. to provide eight separate lamps, each for indicating the operation of either a wash or a rinse cycle.

During the washing cycles, means is provided for adding a supply of soap or washing powders to the wash water or, in the alternative, actuating an alarm signal to alert the operator to supply such washing powders to the tub. This means may be deactivated by a switch during those segments of the wash cycle used for rinse. A switch section 24d is utilized for the washing powder supply function and connects a switch 32, one such switch being provided for each of the eight rinse or wash cycles, and appropriate relays 33 and 34 to the 24-volt AC supply during each of the wash and rinse cycles. Each of the switches 32 has three positions, a first position for connecting relay 33 which operates a buzzer (not shown), an intermediate position to deactivate the supply function during the rinse cycles, and a third position for connecting it to a source of power. Each of switches 32 is connected to alternate even numbered terminals on section 24d so that the supply function is provided only during the wash or rinse cycles and not during the drain cycle. Wiper arm C of switch section 24d is connected through timer delay switch 35 to the source of 24-volts AC and this time delay is set to open the current to switches 32 after the supply mechanism or alarm has operated for a suitable period of time, for example, 1 minute.

Washing machine 30 also includes means for filling the tub with an appropriate supply of water, and this means includes apparatus for supplying hot and cold water in desired amounts. As shown in FIGS. 2 and 3B, cold water valve 36 is provided between a source of cold water (not shown) and washing machine 30 for controlling the flow of cold water to tub 30b and hot water valve 37 is provided between a source of hot water (not shown) and the tub for controlling the hot water content therein. Cold water valve 36, which is a solenoid type valve, is operated by the application of power controlled by a relay 38 and hot water valve 37 is controlled by the application of power through the contacts of relay 39. Relays 38 and 39 are connected to a double pole three position switch 40 and one of these switches is provided for each segment of the wash cycle. Switch 40 and relays 38 and 39 are connected so that in one position of switch 40 only the hot water supply valve is open, in the second position of switch 40 both the hot water and cold water valves are open to supply warm water, and in the third position of switch 40 only the cold water valve is open. The pole terminals of switch 40 are connected to alternate, odd numbered terminals on sections 24f and 24g and through the wiper arms of these sections to water level switch 41, and through the pole contact of this switch to the 24-volt AC supply. Water level switch 41 responds to the hydrostatic pressure of the water in the tub and opens the circuit between the AC supply and switch 40 to shut off the supply of water when it reaches an appropriate level in the tub of the washing machine. An additional switch 41a is connected across water level switch 41 to act as an override to allow the operator to add additional water to tub 30b, as desired.

The washing machine described above and disclosed in FIGS. 3A and 3B also includes means for allowing the operator to select a desired level of water in tub 30b. This means is illustrated in FIG. 3B as medium level solenoid 42, high level solenoid 44, and toggle switch 43, one of each of the latter being provided for each of the eight wash or rinse cycles. As is conventional in commercial washing machines, solenoids 42 and 44 are connected to insert a plug (not shown) or other mechanical mechanism into water level switch 41 and the plug causes level switch 41 to respond to a hydrostatic pressure representing medium or high level of water in tub b, as desired. Each switch 43 is connected through an alternate odd numbered terminal of wafer sections 24e and 24i to the secondary of transformer 28 and is also connected to solenoids 43 and 44. Thus, for selection of the desired water level in each of the wash or rinse cycles, the operator need only switch the associated switch 43 to a position indicating a low, medium, or high level of water, as desired, and the tub will automatically be filled to the desired level.

Means are provided to delay the start of the timing period of the timing circuit during each wash or rinse cycle so that the tub is filled to the desired level with water before the timing for the wash or rinse cycle begins. In the embodiment shown, the wiper arms of variable resistors $R_a$—$R_h$ are all connected in parallel to the contact of relay Re-2 which is normally opened. The coil of relay Re-2 is connected through water level switch 41 to a source of current so that this current is supplied to actuate relay Re-2 when the water level in tub 30b has reached an appropriate level. When relay Re-2 is actuated, resistors $R_a$—$R_h$ are connected through the contacts of relay Re-2 into the timing circuit of unijunction transistor $Q_2$ as described above, so that the charge on capacitor $C_1$ begins.

The even numbered terminals of switch section 24 are connected to a drain relay 50 to connect it to a source of current during the drain periods. When drain relay 50 is actuated it connects a normally closed drain solenoid valve 51 to a source of current to open the valve and drain the water from tub 30b. As previously stated, the drain time is independently set of the wash or rinse time by variable resistor $R_t$.

When the stepping switch 24 is in the drain position, it is desirable that timing capacitor $C_1$ of relaxation oscillator A be shunted by a low resistance or short so that when each of the wash or rinse cycles is switched to, the charge on capacitor $C_1$ will be at the same low level to insure accurate timing periods. As illustrated, the wiper arm C and intermediate even numbered terminals of wafer switch section 24i are connected respectively to opposite sides of capacitor $C_1$ through a resistor $R_{13}$ so that capacitor $C_1$ is shunted during each of the drain periods and unshunted during each of the wash and rinse cycles by resistor $R_{13}$.

In the selection of the sequence of operation of the washing process, it may be desirable to use less than all the wash and rinse cycles available in the programmer. Each of potentiometers $R_a$ through $R_h$ includes a double poled, double throw switch operated in tandem with the wiper arm of the variable resistor, such as illustrated by the reference number 47 in FIG. 3B. When the wiper arm of any variable resistor $R_a$ through $R_h$ is turned fully counterclockwise, one of the poles on switch 47 is closed and one of the poles is opened, and the opposite is true when the wiper arm of $R_a$ through $R_h$ are in positions other than the extreme counterclockwise position. By proper connection of these terminals, when any variable resistor $R_a$ through $R_h$ is turned to the extreme counterclockwise position the segment that this variable resistor represents will be skipped, and stepping switch 24 will be switched to the next adjacent position to operate the next adjacent segment. For this purpose, the normally closed contacts of switch 47 are connected in series with the coil of drain relay 50 so that the drain portion of the skipped segment is skipped when these controls are opened. Also, the normally opened contacts of switch 47 are connected through wafer section 24j to stepper motor 22 and to the DC source 23 so that stepper motor 22 is caused to step wafer section 24 to its next adjacent position when these contacts are opened.

As can be appreciated from the above illustration, the programming mechanism of the present invention is well adapted to control many different processes with a high degree of flexibility and without the use of cams or other timing devices difficult to adjust. Further, the mechanism allows the sequence of the steps to be varied and the time period for each sequence to be easily adjusted as desired by the operator.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the ac-

I claim:

1. A programming mechanism for controlling the order in which a machine performs the steps of a process and the time duration of each step, comprising in combination: a timer including a timing circuit and a stepper switch, said timing circuit including a first relatively long timing period timing oscillator having a plurality of elements that can be adjusted to vary the time period of the circuit, and a second relatively short timing period timing oscillator having at least one adjustable timing circuit element, said stepper switch having a first switch section with a plurality of terminals each connected to one of the adjustable timing circuit elements, and a wiper arm for connection sequentially to the terminals as the switch is stepped to connect the adjustable timing circuit elements and associated timing oscillator into the timing circuit sequentially, said stepper switch further having at least one second switch section having a plurality of terminals and a wiper arm for connection sequentially to their terminals as the stepper switch is stepped to connect one or more components of the machine to a source of power in the order desired to cause the apparatus to perform the steps of a process, the time for each step being determined by the particular adjustable element connected in the timing circuit by said first switch section of the stepper switch; means for stepping said second switch section with the first whereby one of the adjustable elements and associated timing oscillator is connected into the timing circuit for each step performed by the machine to permit the time that the machine performs each step to be adjusted independently of the other steps of the process and selection between relatively long and short timing periods; means for actuating the stepper switch to move the wiper arms of the switch sections into contact with another terminal at the end of each time cycle to start another step in the process; and means for deactuating the timer after all of the steps in the process have been completed.

2. The mechanism of claim 1 wherein each of said adjustable elements is a variable resistor.

3. The mechanism of claim 1 wherein one of said adjustable elements is connected to every second terminal of said first rotary switch section so that the timer period for every second step in said process is the same.

4. The apparatus of claim 1, including means connected to at least one of the terminals of said second switch section and to said penultimate means and causing said stepper switch to switch from said at least one terminal to the next adjacent terminal when switched to said at least one terminal to thereby skip said at least terminal and the step of the process controlled thereby.

5. A programming mechanism for controlling the application of power to a washing machine performing sequential wash, rinse and drain steps in a wash cycle, comprising in combination means for connecting said mechanism to a source of power; a multiposition stepping switch having a plurality of sections each including a wiper arm and a plurality of terminals sequentially connected to said wiper arm as the stepping switch is stepped between positions; the wiper arm one each section being switched to successive terminals to initiate in sequence said wash, drain and rinse periods; an electronic timer including a variable time constant timing circuit connected to the wiper arm of one of said sections, said timing circuit including a first relatively long timing period relaxation oscillator having a plurality of first adjustable timing circuit elements each connected to wash and rinse terminals on said one of said sections for controlling the time of said wash and rinse periods, and a second relatively short timing period relaxation oscillator having a second adjustable timing circuit element connected to the drain terminal on said one section for controlling the time of each drain cycle; means for connecting said timing circuit to said power source connecting means to start a timing period; and means for actuating said stepping switch to move the wiper arms into contact with the next adjacent terminals on the sections in response to the end of each timing period.

6. The mechanism of claim 5 wherein each of the adjustable elements is a variable resistor.

7. The mechanism of claim 5 further including a means for inhibiting the operation of said timer at the start of each wash and rinse cycle until the water in the washing machine reaches a predetermined level.

8. The apparatus of claim 7 in which the means for inhibiting the operation of said timer includes a relay having contacts interposed between the longer period relaxation oscillator and the plurality of terminals, the relay coil being connected to a tub water level switch and a source of current so that the coil is activated when water reaches an appropriate level thereby closing the contacts to allow the wash or rinse cycle timing periods to begin.

9. The apparatus of claim 8 wherein the water level switch includes a plurality of solenoids and a toggle switch allowing the selection of low, medium or high tub water levels for each wash or rinse cycle.

10. An electronic timer for use in a programming mechanism providing a plurality of different on-off timing periods for controlling apparatus performing one or more steps in a process, including periods of relatively long duration and periods of relatively short duration, said timer comprising, in combination: a timing circuit responsive to the application of an electrical voltage and current to begin a preselected timing period and providing a timing period stop signal upon completion of said preselected period, said timing circuit including a first relaxation oscillator for providing said stop signal after passage of a relatively long period of time; and a second relaxation oscillator for providing said stop signal after passage of a relatively short period of time; a switching control means connected to said timing circuit and stopping said preselected timing period responsive to receipts of a stop signal, and means including a stepping switch for alternatively connecting said first oscillator and said second oscillator in said timing circuit upon beginning of a preselected timing period so that said first and second oscillators alternatively provide said stop signal; the first oscillator including a unijunction transistor and means to transmit pulses to a base of said unijunction whereby the peak point current at the gate of said unijunction transistor necessary to cause firing of said unijunction is substantially reduced.

11. The timer of claim 10 wherein said first oscillator includes a timing capacitor and means for shunting said timing capacitor when said second oscillator is connected to said switching control means.

12. The timer of claim 10 wherein said first oscillator includes a plurality of adjustable timing circuit elements each for adjusting the time period that elapses before said stop signal is generated by said first oscillator.

13. The timer of claim 10 wherein each of said adjustable timing circuit elements are variable resistors.